Aug. 24, 1937. A. B. CLARK 2,090,614

SPEED CHANGING MECHANISM

Filed March 6, 1936 7 Sheets-Sheet 1

Inventor

Albert B. Clark

Aug. 24, 1937.  A. B. CLARK  2,090,614
SPEED CHANGING MECHANISM
Filed March 6, 1936  7 Sheets-Sheet 2

Inventor
Albert B. Clark

Aug. 24, 1937.  A. B. CLARK  2,090,614
SPEED CHANGING MECHANISM
Filed March 6, 1936   7 Sheets-Sheet 3

Inventor
Albert B. Clark

Aug. 24, 1937.  A. B. CLARK  2,090,614
SPEED CHANGING MECHANISM
Filed March 6, 1936  7 Sheets-Sheet 4

Inventor
Albert B. Clark

Aug. 24, 1937.　　　　A. B. CLARK　　　　2,090,614
SPEED CHANGING MECHANISM
Filed March 6, 1936　　　7 Sheets-Sheet 5

Inventor
Albert B. Clark

Patented Aug. 24, 1937

2,090,614

UNITED STATES PATENT OFFICE 2,090,614

SPEED CHANGING MECHANISM

Albert B. Clark, Boston, Mass., assignor of one-half to Ole M. Dahl, Boston, Mass.

Application March 6, 1936, Serial No. 67,456

16 Claims. (Cl. 74—336)

My invention relates to improvements in the speed changing mechanism commonly called the transmission of an automobile or the like such as is disclosed in my Patent No. 2,019,174 issued October 29, 1935.

One object of this invention is to provide an improved speed changing transmission mechanism of the character employing means for locking or securing two transmission shaft elements together to secure a one to one drive ratio of these two elements, and employing speed reducing gearing associated with an overrunning clutch, whereby one of these said shaft elements may be given a slower rotative speed than the other in one direction, when the said shaft locking mechanism is released.

Another object is to provide improved means for locking said two shaft elements together, and a simple and convenient means for unlocking said two shaft elements at will.

Another object is to provide constructions utilizing speed changing mechanism of the above mentioned character having two or more different gear drive speed ratios in one direction, in which relative rotation between the transmission mainshaft and certain members mounted thereon may be reduced to a minimum on one of these speeds which may be secured regardless of whether or not the above mentioned shaft locking mechanism is engaged or released.

Another object is to provide constructions whereby the driving connection between the above mentioned type speed reducing gearing and the transmission main shaft may be disconnected at will.

Another object is to provide free-wheeling suppressing means in transmissions utilizing speed changing mechanism of the character above mentioned.

Another object is to provide transmission constructions incorporating principles of my invention, in which the driving connection from forward to reverse and back may be changed without engaging the shift rod actuating control means into more than one of the sliding gear shift rods, also constructions in which either the low speed gear or the second speed gear, whichever is desired, may be preselected in advance.

Another object is to provide a comparatively simple, economical and effective device.

The foregoing and other objects which will appear as the nature of the invention is better understood, may be accomplished by the construction, combination and operative arrangement of parts such as is disclosed by the drawings and specification. The nature of the invention is such as to render it susceptible to various changes and modifications, and therefore I am not to be limited to said disclosure; but am entitled to all such changes therefrom as fall within the scope of the appended claims.

In the transmission illustrated in my said U. S. Patent No. 2,019,174 issued October 29, 1935 before the low speed gear drive can be obtained, the speed change clutch must be released and held released on this drive. In the present invention I have disclosed means whereby the low speed gear drive may be obtained regardless of whether or not the speed changing clutch is engaged or released.

Figures 1, 4:
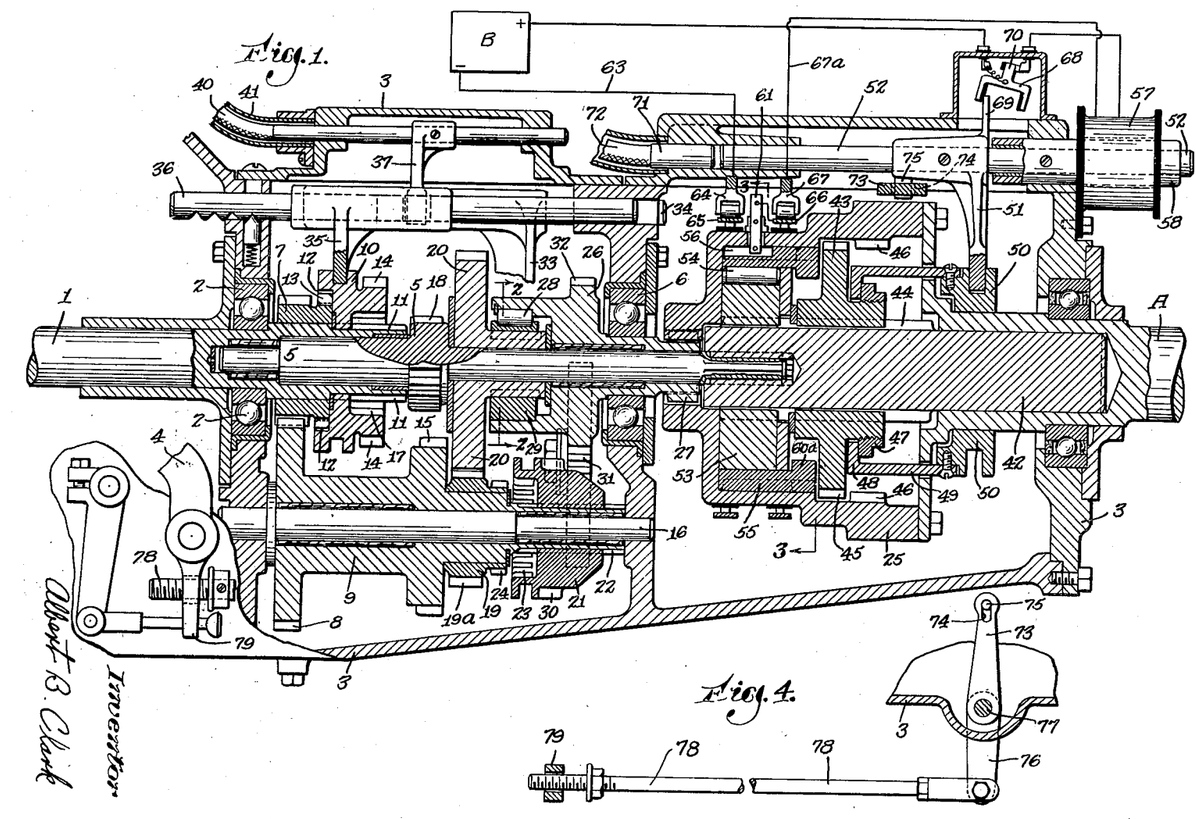
Figure 1 is a longitudinal sectional view of a speed changing gearing mechanism, including the speed change clutch, constructed in accordance with my invention, showing my magnetic speed changing mechanism.
Figure 4 is a plan view, the casing for my mechanism being shown broken away, showing the means for disengaging the speed change clutch.
Figure 2:
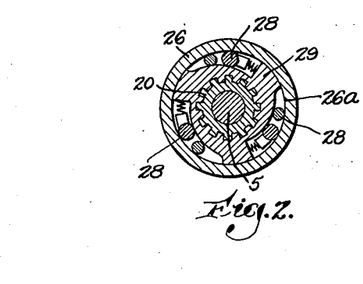
Figure 2 is a sectional view taken on the line 2—2 of Figure 1, showing the overrunning clutch.

Referring first to Figure 1 of the present invention, the numeral 1 denotes the transmission power receiving shaft supported in the usual way in bearings 2 in a transmission casing 3 and adapted to receive power from an engine through means of the usual engine clutch connection, the actuating lever of which is denoted by the numeral 4. Another shaft 5, which I call the power transmitting shaft, in substantial alignment with shaft 1 is supported at one end within a hollow or bored portion of shaft 1 and at the other end its support is maintained by suitable bearings 6 also disposed in the transmission casing 3. For low speed a transmission gear member 7 is rotatably mounted on shaft 1 within the casing and suitably held against axial thrust. This gear 7 is in constant mesh with gear teeth 8 fast on a countershaft transmission element or gear unit 9. A transmission member 10 is slidably secured on shaft 1 by splines 11 so that it may be shifted axially thereon. The transmission member 10 is equipped with clutch teeth 12 designed, when shifting to low speed, to be engaged with clutch teeth 13 with which gear 7 is equipped when transmission member 10 is shifted to the left its limit, as viewed in Figure 1. Transmission member 10 is also equipped with gear teeth 14 adapted, when shifting to second speed, to mesh with gear teeth 15 fast on the said countershaft transmission element 9, when the said member 10 is shifted to the right its limit.

Countershaft element 9 is preferably rotatably mounted on a fixed countershaft 16 in the usual way as shown. Transmission member 10 is also equipped with clutch teeth 17 adapted to be put into mutual engagement with clutch teeth 18 which are fast to shaft 5 when this member 10 is shifted to the right the required distance. This engagement takes place preferably slightly before the meshing of gear teeth 14 and 15, for the reasons given hereinafter. Shifting space is provided so that member 10 may be put into an intermediate or neutral position, out of engagement with clutch teeth 13 and 18 and gear teeth 15, whereby shaft 1 may rotate idly without turning the countershaft element 9 or shaft 5.

A gear 19 having gear teeth 19a is in this case rotatably mounted on countershaft element 9, adjacent to gear teeth 15, and a gear member 20 meshing with gear 19 is rotatably mounted on shaft 5. To said gear member 20, low speed from gear 7, or intermediate speed from gear teeth 14, is transmitted from gear 19. For operatively connecting gear 19 to countershaft element 9, to obtain either low speed or second speed a shift member 21 slidably secured to element 9 by splines 22 is provided. This shift member is equipped with clutch teeth 23 adapted to be put into engagement with clutch teeth 24 on gear 19 when the member 21 is shifted to the left the required distance. Gear 19 if preferred may be a part of shift member 21 as long as it may be operatively disconnected from gear 20, this being simply a matter of design.

In the present invention I have devised a novel tooth speed change clutch and also mechanism whereby it may be operated effectively, and also an improved friction type of clutch for this purpose. The housing element 25 of the speed changing clutch, which said housing is connected to propeller shaft A, is utilized for transmitting rotative power from gear member 20 to the propeller shaft element A of a vehicle, in the forward drive rotative direction through means of an overrunning clutch connection, whereby, when the reduced speed gearing, including gear member 20, comes into action, a reduced speed forward gear drive may be obtained. In this case this overrunning clutch is not connected directly between the gear 20 and the housing element 25, as it is desirable to enable the latter to be separately removed. Therefore a transmission member 26 is connected to one end of the housing element 25 preferably by splines 27 or equivalent detachable means whereby bearing 6 can be easily removed when desired. In this case the other end of member 26 is equipped with an internal surface 26a adapted to the overrunning clutch binding elements which in this case are rollers 28, but may be other suitable means. For completing the overrunning clutch connection in this case a cam member 29 having cam surfaces adapted to the rollers 28 is splined to gear 20 so that the overrunning clutch may be removed as a unit without disassembling its parts. This overrunning clutch arrangement is such that in the normal forward drive, rotative direction, the rotation of gear 20 may be imparted to member 26 through the binding action of the rollers 28, providing shaft 5 and housing element 25 are in condition to turn independently, that is not clutched together. Of course, as member 26 is connected directly to housing 25 which is connected to the propeller shaft element, the latter will thus turn at the same rotative speed as and when driven by gear 20.

Thus with the above mechanism a low speed in one direction may be obtained when transmission member 10 is shifted into engagement with gear member 7, this drive being secured through the medium of gear teeth 8, gears 19 and 20 and the said overrunning clutch, regardless of whether shaft 5 and housing element 25 are clutched together or unclutched.

When shaft 5 and housing element 25 are unclutched, a higher or intermediate speed gear drive may be obtained when transmission member 10 is shifted its limit to the right, so as to mesh with gear teeth 15, this drive also being secured through the medium of gears 19 and 20, and the said overrunning clutch.

For reversing the propeller shaft elements and consequently the vehicle with the transmission shown in Figure 1, shift member 21 is equipped with gear teeth 30 adapted to be put in mesh with a reverse idler gear 31 when the member 21 is shifted to the right its limit. Said idler gear 31 is in constant mesh with gear teeth 32 formed on transmission member 26.

Figure 7:
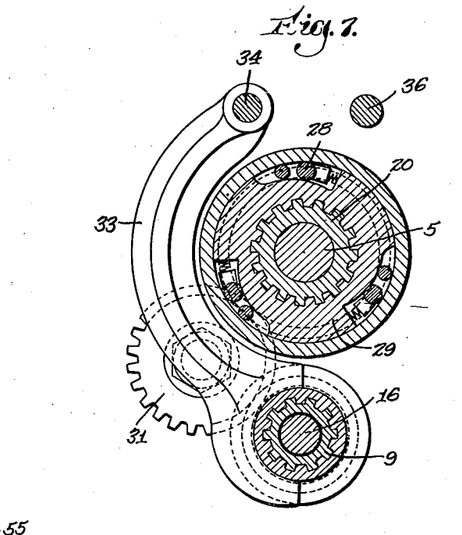
Figure 7 is a sectional view taken on line 7—7 of Figure 5 showing the overrunning clutch.

For shifting member 21 it is provided with a circular groove adapted to a shift fork 33 carried by a sliding shift rod 34. This is best illustrated in Figure 7 of the drawings. A similar shift fork 35 carried by another rod 36 shifts transmission member 10. A shift finger 37 which may be of a well known type, may be put into engagement with either of these two shift rods 34 and 36 when shift member 10 is in the position shown in Figure 1 of the drawings, and shift member 21 is in engagement with clutch teeth 24 of gear 19. Slots 38 and 39 properly placed take care of correct positioning of the rods for proper shifting.

To go into reverse, assuming a start from neutral position, in the mechanism shown in Figure 1, transmission member 10 is first put into engagement with clutch teeth 13 of gear 7 and then shift finger 37 is changed to engage shift rod 34, whereby shift member 21 may be shifted into mesh with the reverse idler gear 31 giving a reverse drive to the propeller shaft elements regardless of whether the housing element 25 and shaft 5 are clutched together or not. I prefer to control the shift finger 37 by means of a flexible cable 40 which may be of well known make attached to the said finger at one end and running through a sheath 41 to a grip or handle not shown, preferably located on the instrument panel or other convenient place. When said cable 40 is twisted said shift finger 37 is turned accordingly, whereby it may be put into engagement with either shift rod 34 and 36 when the latter are properly positioned. Pulling out or pushing in the said handle will slide the respective shift rod which finger 37 is in engagement with accordingly.

For securing a one to one ratio or straight drive, as it is commonly called, between shaft 5 and the speed change clutch housing 25 a clutching medium is provided to lock these elements together. For this purpose shaft 5 may be extended as far as desired within housing 25, but I prefer to have a shaft section 42, which is part of the power transmitting shaft means, splined to shaft 5. Separately constructing these shafts is a matter of design opinion; however, with the arrangement shown, the speed change clutch may be removed as a unit without disassembling its parts and without disturbing the gearing.

Figure 3:
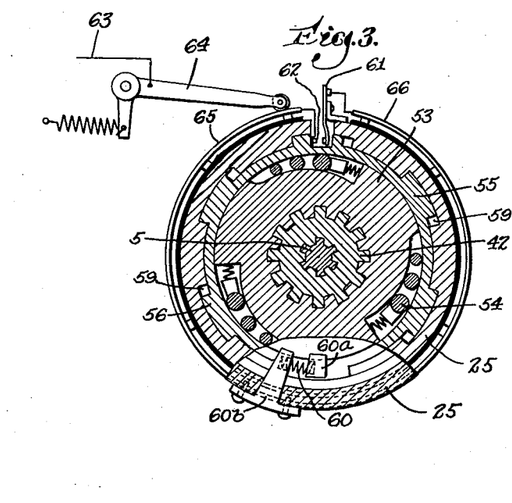
Figure 3 is a sectional view taken on the line 3—3 of Figure 1 showing the free wheeling suppressing mechanism and circuit closing means for operating the speed change clutch.

In the novel clutch mechanism which I have devised shown in Figure 1, a clutch member 43 is slidably secured to shaft section 42 by splines 44 and is equipped with clutch teeth 45 adapted to engage with clutch teeth 46 secured to housing 25. This engagement is effected when the clutch member 43 is shifted to the right from the position shown in Figure 1. For shifting member 43 into and out of this engaging position it is equipped with a circular groove one side of which I have formed by a flange 47 screwed or otherwise detachably connected to member 43 so that a shifting ring or collar 48 adapted to this groove can be easily inserted therein. Fingers 49 connect this ring with an external collar 50 having a circular groove adapted to receive a shift fork 51 secured to a sliding shift rod 52 although if desired this shift fork 51 may be pivotally supported instead of slidably. On forward intermediate speed the clutch teeth 45 and 46 are necessarily out of engagement. In this condition obviously free wheeling could take place as housing 25 which is connected to propeller shaft A, would be free to overrun shafts 42 and 5. Therefore I provide a special overrunning clutch to check or limit this. The central binding member 53 of this overrunning clutch rotates in a counter clockwise direction as shown in Figure 3, in all forwards speeds. It is secured to shaft section 42 by the splines 44 and is equipped in the usual way with cam surfaces adapted to the roller binding elements 54. The outside binding member of this overrunning clutch is a sleeve 55 having its inside surface adapted to the roller binding elements 54. This sleeve 55 is secured to housing 25 by splines 56 which are integral with said sleeve, whereby this mechanism may be easily removed from the housing 25.

This overrunning clutch comes into binding action on second speed forward drive, when the rotative speed of shaft 42 slows to the same approximate speed as housing 25, as a result of slowing down the motor. When this occurs it is clear that the clutch teeth 45 and 46 may be easily engaged without releasing the engine clutch, since in this binding condition of the overrunning clutch these teeth are rotating at the same speed. I make use of this effect in arranging a novel electro-magnetic mechanism for putting the clutch teeth 45 and 46 into engagement automatically, as this overrunning clutch binding action occurs. This engagement may be accomplished by mechanical leverage; but as shown in Figure 1 it is accomplished by the completing of an electrical circuit which energizes a solenoid 57 having an armature 58 connected to the sliding shift rod 52 whereby when this solenoid is energized the clutch teeth 45 are forced into contact with the clutch teeth 46. In order to provide for energizing this solenoid at the proper time, when this overrunning clutch goes into binding action, at which time teeth 45 and 46 are turning together as stated, I have arranged the splines 56 narrower circumferentially than the grooves 59 into which they fit. When this overrunning clutch is not binding, these splines 56 are kept spaced in the wider grooves 59 as shown in Figure 3 by the tension of springs 60 disposed therefor between projections 60a of sleeve 55 and projecting elements 60b secured to housing 25 therefor.

In this condition an insulated electrical contact member 61 secured to housing 25 is out of contact with a contact member 62 secured to sleeve 55. When the free wheeling suppressing overrunning clutch binds, which is normally the case when the accelerator pedal is suddenly released when the vehicle is under way the splines 56 are forced to the opposite side of grooves 59, and contact members 61 and 62 then touch. This establishes the electrical circuit to the said solenoid 57 through conducting wiring 63 from a source of current which may be a storage battery B, to a spring tensioned contact member 64 to an insulated rail or band 65 encircling housing 25 and electrically connected to contact member 62. Thence the circuit is through contact member 61 to another similar band or rail 66 electrically connected to member 61, and thence through another spring tensioned contact member 67 and wiring 67a to the solenoid 57 and thence back to the battery B.

Figure 16:
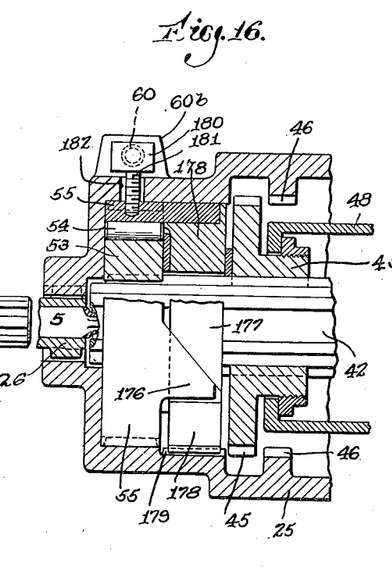
Figure 16 is another longitudinal sectional view of a modification of the clutch of my speed changing gearing mechanism.

In order to prevent unnecessary use of battery current, I provide a switch or circuit breaker 68 in one of the said electrical wires. I have shown a simple form of switch for this purpose, adapted to be held in either "on" or "off" position by friction. When the teeth 45 and 46 are engaged a finger 69 secured on shift rod 52, or moving therewith, throws the switch arm 70 to "off" position thereby breaking the said circuit at this point. When the teeth 45 and 46 are disengaged the switch arm 70 is thrown the opposite way to "on" position as shown in Figure 1, thereby again establishing the circuit from the battery B to the rail 66 through this switch 68. The above described contact members and rails may be located at any suitable place, and springs 60 may be located outside housing 25 if preferred as illustrated in Figure 16 of the drawings.

In order to enable the operator to put clutch teeth 45 and 46 into mutual engagement at will in case of any failure of the said electrical system, I have provided a manually controlled push rod 71 connected by a flexible control lead 72 preferably to a grip or knob not shown, whereby actuating the push rod 71 will by pushing shift rod 52, force the clutch teeth 45 into contact with teeth 46 for their mutual engagement.

To provide for disengaging the clutch teeth 45 from teeth 46 at will for securing reduced speed drive, I utilize the engine clutch release pedal lever 4, thereby eliminating a special control means for this purpose. For doing this a lever arm 73 is pivotally supported in a portion of housing 25 and one of its ends is equipped with a hole or slot 74 adapted to receive a pin 75 secured on the casting of shift fork 52. Moving as one with lever arm 73 is an external lever arm 76 shown in Figure 4, both these arms 73 and 76 being secured to a shaft 77 extending through an offset portion of casing 3. Arm 76 is connected to one end of a push rod 78 whose other end is slidably supported in a position whereby when the engine clutch release lever arm 4 is pressed way down in releasing the engine clutch the projection 79 on engine clutch lever 4 will force push rod 78 to the right far enough to cause clutch teeth 45 to disengage from teeth 46 if they are not already disengaged. Adjustment may be easily made whereby the teeth 45 may be disengaged when the engine clutch releasing lever 4 is pressed any predetermined distance.

Reduced speed drive secured by disengaging the clutch teeth 45 from teeth 46 may be easily and quietly obtained; the drive being then transmitted through the overrunning clutch rollers 28 which come into binding action silently and smoothly.

The speed changing clutch mechanism which has been just described may also be used in other gearing arrangement where applicable functionally.

The said free wheeling suppressing overrunning clutch may be between member 26 and shaft 5 if desired, having functionally the same effect.

When transmission member 10 is disengaged from clutch teeth 13 and clutch teeth 18 my mechanism is in neutral. To shift into low speed, transmission member 10 is shifted to the left its limit, as shown in Figure 1, its clutch teeth 12 meshing with clutch teeth 13 on gear 7, the driving connection being then through gear teeth 19a and gear member 20 when shift member 21 is shifted to the left as previously described.

To shift into second speed, transmission member 10 is shifted to the right its limit thereby disengaging said teeth 12 and 13, and engaging the gear teeth 14 with gear teeth 15, and clutch teeth 17 with clutch teeth 18 as previously described, this drive also being transmitted through gear teeth 19a to gear member 20.

To change into high speed, the speed of connected shafts 1, 5 and 42, which in first and second speeds are rotating faster than propeller shaft A, is slowed by reducing the supply of fuel to the motor, and when the speed of rotation of said connected shafts 1, 5 and 42, and central binding member 53 splined to shaft 42 slows to the speed of propeller shaft A and connected housing 25 then the roller binding elements 54 start to bind with sleeve 55 causing said sleeve 55 to change its relative position to housing 25 whereby contact members 61 and 62 contact each other thereby establishing a circuit to the solenoid 57 which forces clutch teeth 45 and 46 into contact with each other, as previously described.

Figure 5:
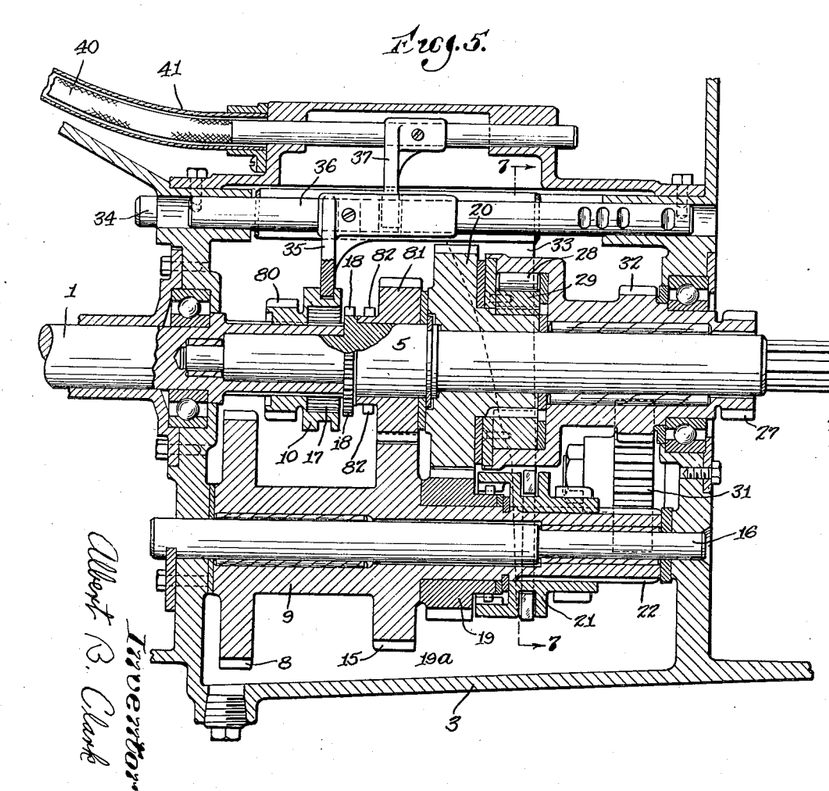
Figure 5 is a longitudinal sectional view of a modification of my speed changing gearing mechanism.
Figure 6:
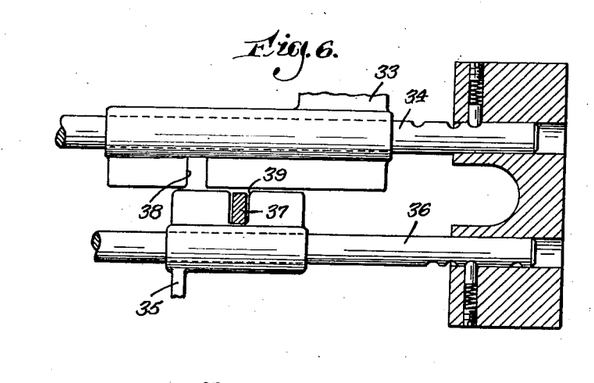
Figure 6 is a plan view, the casing being shown broken away, of the gear shifting rods shown in Figure 5.

Figure 5 illustrates a modification of the gearing set-up shown in Figure 1; but is functionally the same. In this modification the slidable transmission member 10 is equipped with gear teeth 80 adapted to mesh with the gear teeth 8 when shifted to the left its limit. A gear 81 is rotatably mounted on shaft 5 and is in constant mesh with the gear teeth 15, and is equipped with clutch teeth 82, adapted for mutual engagement with the clutch teeth 17 with which member 10 is equipped when the latter is shifted its limit to the right. By shifting member 10 only part way to the right the teeth 17 thereof may be put into engagement with clutch teeth 18 on shaft 5 without engaging the teeth 82, thereby enabling the reduction gearing to be put out of rotative engagement at will while still maintaining high speed drive. This feature is especially useful when any of the gearing arrangements having it are utilized with a fluid type of speed change clutch, as the vehicle may be started directly on the fluid drive medium and the gearing then put into operative connection at any time desired simply by shifting member 10 to the right. To be correct according to the engaging position of member 21 in Figure 5, shift finger 37 should be in engagement with shift rod 36 as shown in Figure 6, whereas to be correct according to the gear position shown in Figure 1 the shift finger 37 should be in engagement with shift rod 34.

Figure 8:
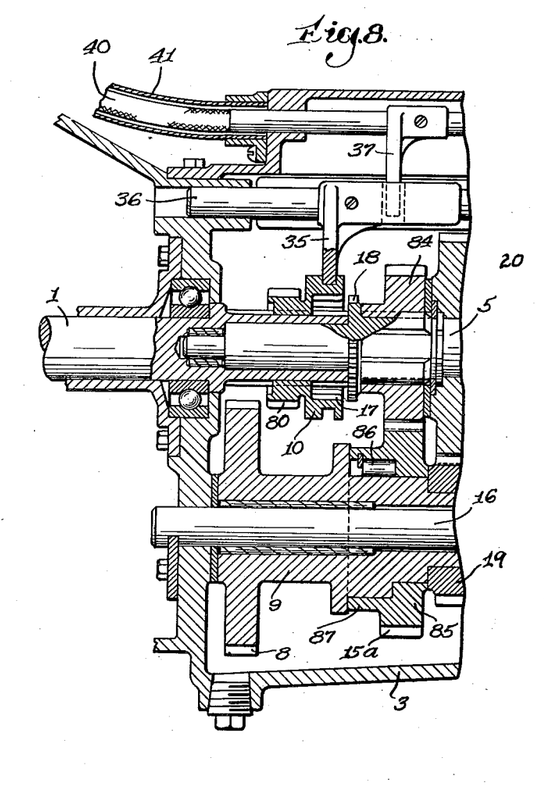
Figure 8 is a longitudinal sectional view broken away of a modification of my speed changing gearing mechanism shown in Figure 5.

Figure 8 illustrates further modification of the gearing. In this the gear 84 corresponding to gear 81 in Figure 5 in the modification just described, is splined to shaft 5 and gear teeth 15a corresponding to gear teeth 15, are located on a member 85 rotatable on countershaft transmission element 9. For establishing a driving connection between gear member 85 and element 9 in order to secure reduced speed drive from gear 84, overrunning clutch binding means, in this case rollers 86, are disposed between them. For this purpose a portion of element 9 is formed with cam surfaces adapted to the rollers 86, and member 85 is formed with an annulus 87 having an inside binding surface also adapted to these rollers in a way well known. The rollers 86 bind the countershaft element 9 and annulus 87 together when gear 84 becomes the driving member and tends to turn gear member 85 faster than countershaft element 9 in the normal forward speed rotative direction of the latter, which is clockwise looking from the propeller shaft end of the transmission.

This arrangement of gearing like the arrangements illustrated in Figure 1 and Figure 5 permits low speed to be obtained regardless of whether the speed changing clutch to be utilized therewith is engaged or released. It also has the additional advantage in that the engine compression may be utilized to give a braking effect to the vehicle through the low speed gears when desired, providing the hereinbefore described free wheeling, suppressing, overrunning clutch is utilized as I have disclosed.

Figure 9:
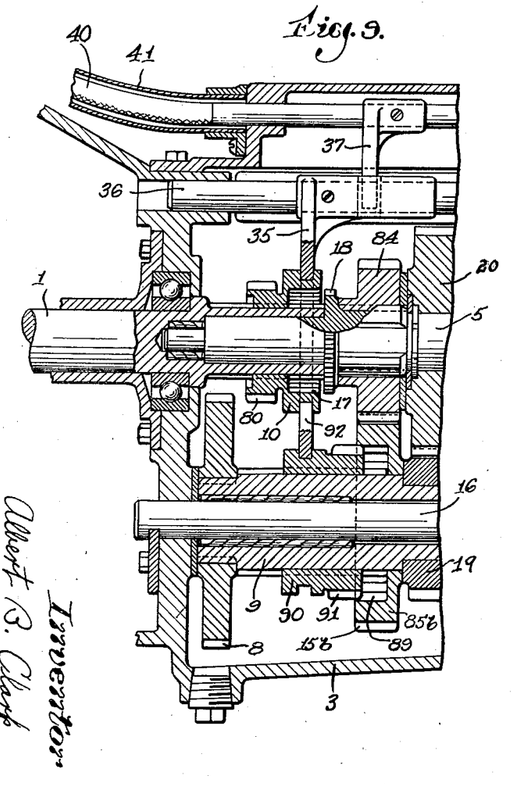
Figure 9 is a longitudinal sectional view broken away of another modification of my speed changing gearing mechanism shown in Figure 5.

Figure 9 illustrates another gearing modification whereby the low speed may be obtained regardless of whether the speed changing clutch is engaged or released. In this as in the preceding modification the gear 84 is in constant mesh with gear teeth denoted in this case by 15b and is splined to the shaft 5, and the countershaft gear member 85b corresponding to gear member 85 in the preceding modification is rotatably mounted on countershaft transmission element 9 without rollers 86 between. Gear member 85b in this modification is equipped with clutch teeth 89 for operatively connecting it to element 9. For completing this connection a shiftable transmission member 90 is slidably secured by splines on element 9 and is equipped with clutch teeth 91 adapted to be put into engagement with clutch teeth 89 when this member 90 is shifted far enough to the right. For properly shifting this member 90 I prefer to connect its shift fork 92 to the shift fork 35 of transmission member 10, the arrangement being such that gear 85b will be disengaged from operative connection with member 90 before transmission member 10 is shifted far enough to the left to engage the low speed gear teeth 8. I prefer to have the arrangement also such that the member 10 may be disengaged from clutch teeth 18 without causing the disengagement of clutch teeth 89 and 91. This construction enables neutral to be obtained without necessarily putting the gear member 85b out of its operative connection.

Figures 10, 11:
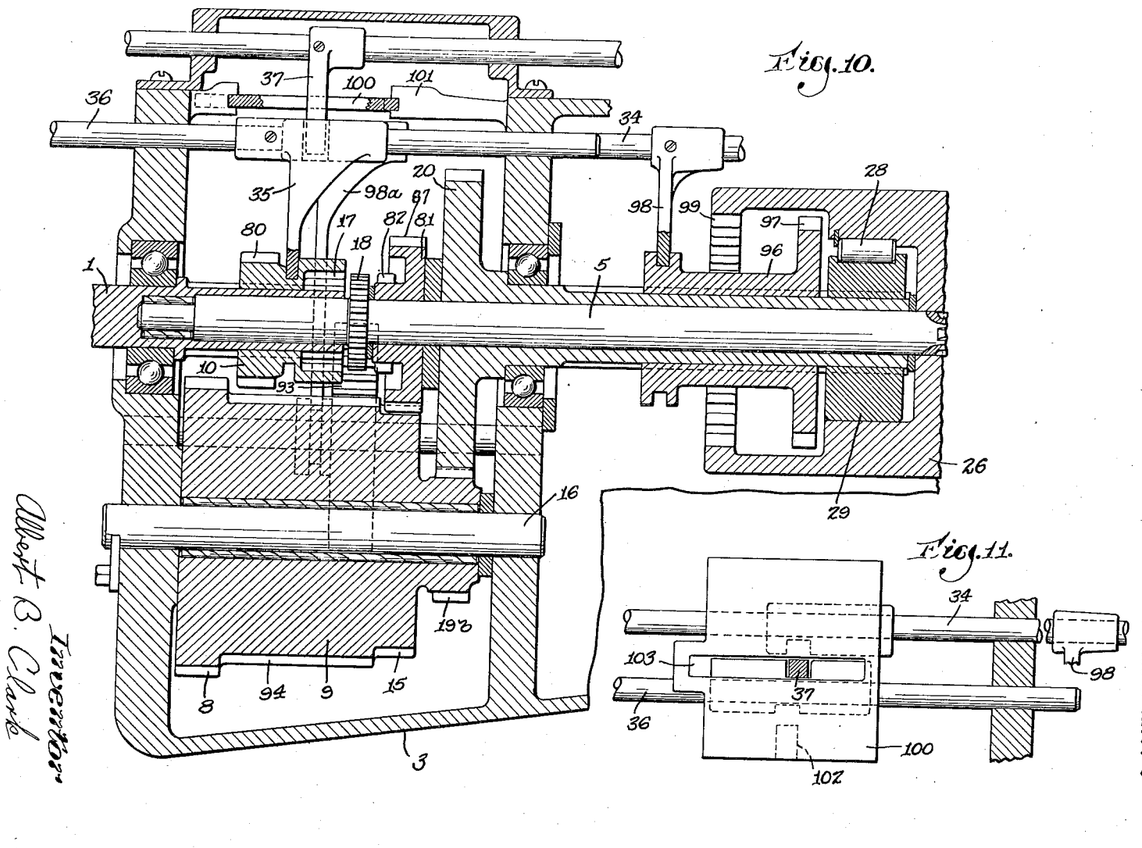
Figure 10 is a longitudinal sectional view broken away of another modification of my speed changing gearing mechanism.
Figure 11 is a plan view of the shift rod holding means shown in Figure 10.

Figure 10 illustrates particularly a modification of the gearing and also of the speed reduction drive overrunning clutch. In this modification gear teeth 19b which are adapted to mesh with gear 20, as well as gear teeth 15 meshing with second speed gear 87, are both formed on countershaft transmission element 9, and shift member 21 is eliminated since the reverse idler gear denoted in this modification by 93 is located so as to be in constant mesh with gear teeth 94 formed on countershaft element 9. The arrangement is such that when the shift member 10 is in neutral the idler gear 93 may by shifting it to the left be put into mesh with gear teeth 80 on member 10, which may be special teeth for this purpose, thereby imparting a reverse rotation through countershaft element 9 to gear 20. For completing the reverse drive from gear 20 to the propeller shaft elements through speed change clutch housing 25, connective means must be established between these two, hence a shift member 96 having clutch teeth 97 is slidably splined on the hub of gear 20. Shift member 96 is equipped with a circular groove adapted to a shift fork 98 secured to the same shift rod 34 which shifts the reverse idler gear by fork 98a. This arrangement is such that when the idler 93 is put into mesh with gear teeth 80 clutch teeth 97 will at the same time be put into engagement with clutch teeth 99 formed on transmission member 26 adapted to be attached to speed change clutch housing element 25. In order to prevent shift member 10 from being displaced when the reverse idler is shifted into engagement with it, a plate 100, slidable crosswise in guides 101 in the transmission casing, has a projecting portion 102 on its under surface which enters a hole therefor in the shift rod 36 connected to member 10 when the shift finger 37 moves the said plate, which movement occurs as this said finger 37 is shifted into engagement with the reverse shift rod 34. A slot 103 in plate 100 allows the finger 37 to be shifted its limit lengthwise of the transmission without interference by the plate 100, but not crosswise. This may be clearly understood from the plate plan illustrated in Figure 11.

Figures 12, 13:
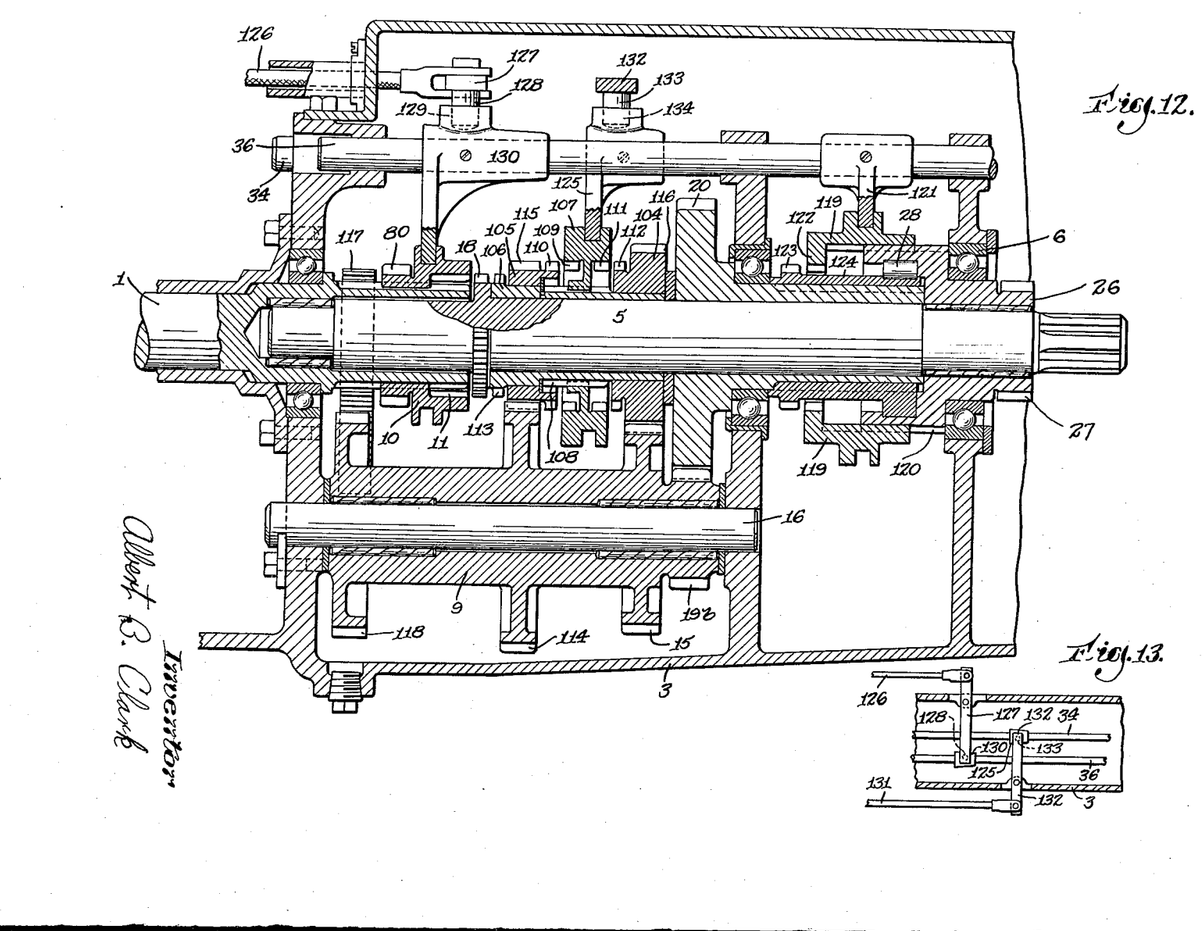
Figure 12 is a longitudinal sectional view of a modification of my speed changing gearing mechanism showing preselecting mechanism.
Figure 13 is a detail sectional view of the shift rod control means shown in Figure 12.

Figure 12 illustrates a somewhat different arrangement of gearing. In this the low speed as well as the second speed cannot be obtained unless the speed change clutch, whether of tooth engaging, friction or fluid form, is released sufficiently to allow binding action of the overrunning clutch rollers 28 to take place. Another feature found in this modification is that either the low speed or the second speed gear, whichever it is desired to have as the driving gear for forward reduced speed drive, may be preselected and preconnected for this purpose.

In arranging the mechanism for this the second speed gear 104 and the low speed gear 105 are both rotatably mounted on a sleeve formed transmission member 106 which in turn is rotatably mounted on shaft 5 as may be seen in Figure 12. A shift member 107 is slidably secured on member 106 by splines 108. Shift member 107 is equipped with clutch teeth 109 adapted to engage clutch teeth 110 on gear 105 when shifted to the left far enough, and is also equipped with clutch teeth 111 adapted to engage clutch teeth 112 on gear 104 when shifted to the right far enough. The sleeve member 106 is equipped with clutch teeth 113 adapted to be engaged by clutch teeth 11 on shift member 10 when the latter is shifted its limit to the right. Thus with teeth 113 and 11 engaged, whichever of the two gears 104 and 105 happens to be clutched to the sleeve member 106 will be the driving gear for securing forward reduced speed drive, which may be thereby secured as hereinbefore described when the speed change clutch is released sufficiently to allow binding action of the said overrunning clutch rollers 28. Gear teeth 114 formed on transmission element 9 are in constant mesh with gear teeth 115 on low speed gear member 105, and gear teeth 15 are in constant mesh with the teeth 116 on second speed gear member 104, whereby rotative power from either gear 104 or 105 whichever happens to be engaged, may be transmitted through countershaft element 9 to gear 20 and thence through the said overrunning clutch rollers 28 to transmission member 26 and thence to speed change clutch housing 25 and the propeller shaft elements as hereinbefore described, whereby the latter turn at the reduced speed, determined by the ratios of the gears in use.

For securing reverse drive with this modification an idler gear 117 is rotatably mounted so as to be in constant mesh with gear teeth 118 on countershaft element 9. This idler gear 117 is adapted for full engagement with the gear teeth 80 on shift member 10 when the latter is shifted its limit to the left, thereby enabling a reverse drive to be imparted to gear 20 through countershaft element 9. For completing the reverse drive from gear 20 to the propeller shaft elements through transmission member 26 connective means must be established between these two as in the modification illustrated in Figure 10, hence a shift member 119 is slidably secured on a portion of member 26 by splines 120. For shifting member 119 it is equipped with a groove adapted to a shift fork 121 secured to the same shift rod 36 which shifts gear member 10. Shift member 119 is equipped with clutch teeth 122 adapted to be put into engagement with clutch teeth 123 turning as one with gear member 20. In this case the teeth 123 are formed on a sleeve 124, splined to the hub of gear member 20. The arrangement is such that the engagement of teeth 122 and 123 is effected when teeth 80 of gear member 10 are put into engagement with the reverse idler gear 117. When member 10 is in neutral teeth 122 and 123 are disengaged. For shifting member 107 a shift fork 125 is provided.

This is secured to shift rod 34. For actuating these shift rods 34 and 36 in this modification I prefer to utilize a flexible push-pull control 126 and 131 one to each shift rod. One end of the flexible control 126 may be connected to a control knob or grip not shown, and its other end is pivotally secured to one end of a lever 127 pivotally secured in the casing 3. The other end of lever 127 is preferably equipped with a pin 128 adapted to enter a hole 129 in the shift fork casting 130. With this shift mechanism, a neutral, reverse or forward drive may be obtained regardless of which gear the member 107 is in engagement with. To actuate said shift fork 125 the push-pull control 131 is pivotally fastened to a lever 132 equipped with a pin 133 adapted to enter a hole 134 in the shift fork 125.

It will be seen that with this modification when on high speed drive, with the speed change clutch connected, either gear 104 or 105, whichever is desired, may be put into engagement at will, or if desired both these gears may be disengaged, whereby rotation of the gearing will be practically stopped. This latter may be effected also by shifting member 10 only far enough to engage the clutch teeth 18 on shaft 5 without engaging teeth 113, thereby maintaining the high speed drive, yet permitting the gearing to be easily brought into engagement at will. This feature is desirable when a speed changing clutch having a fluid drive medium is utilized instead of the engaging tooth type clutch, for the reason that the car may be started on the fluid drive medium and the gearing then engaged at any time desired, or when found necessary. When the gearing is used with a fluid type speed change clutch only one of the gears 104 and 105 probably would be needed, in which case it may be secured to sleeve 106, instead of being rotatable thereon.

When driving through either gear 104 or gear 105 with this device in which condition the speed change clutch is disengaged, and utilizing the tooth type speed changing clutch which I have disclosed, a short period of free wheeling is had when the accelerator pedal is suddenly released under normal driving conditions, during which the gears 104 and 105 may be easily engaged, in most cases without necessity of releasing the engine clutch.

Figures 14, 15:
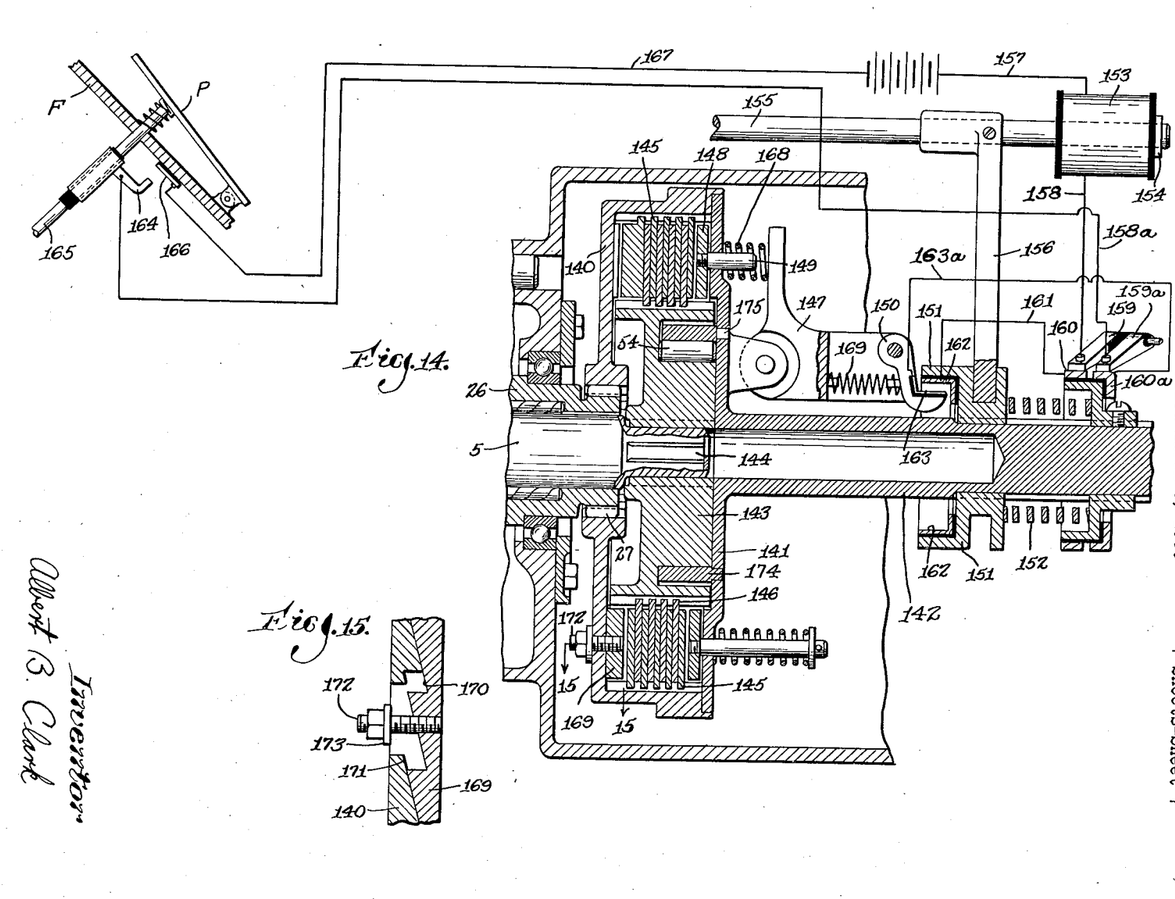
Figure 14 is a longitudinal sectional view of a modification of the clutch of my speed changing gearing mechanism.
Figure 15 is a sectional view taken on the line 15—15 of Figure 14 showing clutch disk adjusting means.

Figure 14 illustrates a friction type speed changing clutch which may be utilized for my invention in place of the engaging tooth type. The housing element 140 of this clutch, like the speed change clutch housing 25 shown in Figure 1, is detachably connected to transmission member 26 by the splines 27. The cover plate 141 of this clutch has a shaft 142 adapted to be connected to the propeller shaft or its universal joint so as to turn as one therewith. A clutch rotor 143 is secured to shaft 5 preferably by splines 144 whereby the clutch may be easily removed. A set of friction discs 145 turning with clutch housing 140 are arranged so they may be put into frictional engagement with another set of clutch discs 146 turning with the said clutch rotor 143.

This engagement is effected by the force exerted by several centrifugal weight members 147, this force being applied to clutch press ring 148 through press pins 149 when the propeller shaft reaches a predetermined speed. Engagement of this clutch as with the tooth type clutch hereinbefore described, enables a higher speed to be obtained than when it is disengaged. For enabling the operator of the vehicle to maintain disengagement of the speed change clutch as long as desired, I have provided a weight catching mechanism for holding back centrifugal weights 147 so they will not cause clutch engagement until the operator so desires. For this purpose a spring tensioned catch member 150 is pivoted on each centrifugal member 147. A collar 151 is slidably mounted on hub 142. This collar 151 has a projecting portion so arranged that when said collar is moved its limit to the left, the said projecting portion will extend over the path of the said catch members and thereby prevent their being thrust outward far enough to cause clutch engagement, until the said collar 151 is moved to the right. A spring 152 is disposed so as to normally force collar 151 to the left as shown. For actuating collar 151, I utilize a solenoid 153 having an armature 154 secured to a shift rod 155 carrying a shift fork 156 adapted to fit a groove on collar 151. The electrical circuit for actuating the said solenoid 153 is established through wiring 157 from any source of current to the said solenoid. From the solenoid 153 the said circuit is through wiring 158 to a spring tensioned contact 159 in electrical contact with an insulated band 160 secured on clutch shaft 142. From thence the circuit is through wiring 161 to insulated contact pieces 162 carried by said collar 151. Each of said contact pieces 162 are so positioned that they will contact a contact member 163 on said catch member 150 when the car reaches the speed necessary to cause the weights 147 to fly outward far enough for this to occur. Through means of wiring 163a, insulated band 160a, contact member 159a and wiring 158a the contact members 163 are electrically connected to a contact finger 164 carried by the accelerator pedal rod 165. The finger 164 is adapted to make contact with another contact member 166 shown on the floor board F when the foot pressure is let up from the accelerator pedal P. Contact member 166 is connected by wiring 167 to the source of current thereby completing the solenoid circuit. From the foregoing it will be seen that this circuit is completed only when the accelerator pedal P is let up, and when contact members 162 and 163 touch. Operating space is provided so that the clutch discs 145 and 146 will not be put into frictional engagement unless the car speed is great enough to cause weight members 147 to fly outward beyond the point necessary for contact members 162 and 163 to touch. Spring 168 being stronger than the weaker catch spring 169, will cause the weight members 147 to centralize when the car slows down, the shape of catch members 150 permitting them to be pressed inwardly so as to pass down freely by collar 151. For adjusting the point at which frictional engagement of discs 145 and 146 takes place, I provide an adjustable backing ring 169 having slanting faces 170 adapted to contact with other slanting faces 171 formed on clutch housing 140. By turning this backing ring 169 it may thereby be forced nearer to discs 145. This ring 169 may be turned by bolts 172 secured thereto and extending through a slot 173 in housing 140.

In this case I have disposed the free wheeling, suppressing overrunning clutch rollers 54 between clutch rotor 143 and an annular ring 174 secured to the clutch cover plate by lugs 175. Rotor 143 is suitably equipped with cam surfaces adapted to the roller 54 as explained in connection with the clutch illustrated in Figure 1, the operation being the same.

Figure 16 illustrates means for effecting the engagement of the speed change clutch teeth 45 and 46 by mechanical means instead of through the medium of the electro-magnetic means illustrated in Figure 1. With this mechanism the engagement of these teeth 45 and 46 is effected as and when the rollers 54 come into binding action with some degree of force. For this purpose I provide the splined sleeve 55 with lateral cam or wedging elements 176 adapted to operate against other cam or wedging elements 177 formed on a slidable push member 178 preferably freely supported on shaft section 42 and slidably secured to housing element 25 by splines 179, whereby this member 178 may be forced against clutch member 43 so as to move it into engagement with teeth 46. In this case the spring 60, for normally keeping the sleeve 55 in proper relation with housing 25 as explained in connection with Figure 1, I prefer to have located outside the housing 25, and for this purpose projecting element 60b secured to housing 25 is turned outward and instead of the lateral projection 60a for springs 60, I provide a member 180 secured to a bolt 181 threaded into sleeve 55. This bolt 181 extends through a slot 182 formed in housing 25, so that sleeve 55 can move the full limit necessary relative to housing 25. Spring 60 is as strong as needed to keep sleeve 55 properly spaced with respect to housing 25, and is disposed between projection 60b and member 180. The arrangement of this mechanism is such that when the overrunning clutch rollers 54 come into binding action with sufficient force to cause enough relative movement between sleeve 55 and housing 25 to compress spring 60, this movement of sleeve 55 causes its said cams 176 to press the push member 178 against the clutch member 43 far enough to put the clutch teeth 45 into engagement with teeth 46. If necessary some of the splines 56 shown in Figures 1 and 3 for securing sleeve 55 to housing 25 may be eliminated to provide sufficient space so that sleeve 55 may turn far enough relative to housing 25 to permit full operative action of said cam elements. For this purpose more space is required for grooves 59 than is necessary in the mechanism illustrated in Figure 3. In connection with the means for disengaging the clutch teeth 45 and 46, means other than the engine clutch pedal may be used for this purpose, such as an electric or suction actuated means not shown.

What I claim is:

1. In a transmission of the class described, a power transmitting shaft, a gear rotatable on this shaft, another power transmitting shaft in substantial alignment with the first said shaft, a housing connected to the second-mentioned shaft and rotatable therewith embodying a transmission member, overrunning clutch mechanism embodying binding means between the said transmission member and said rotatable gear adapted to bind them when the said second shaft turns in one direction at the same speed as the said rotatable gear thereby transmitting rotative power to the second said shaft from said rotatable gear, clutching mechanism between the said two shafts adapted for clutching engagement to thereby operatively connect the said two shafts, control means for causing the engagement of the said clutch mechanism, and other overrunning clutch mechanism embodying binding means between the said two shafts adapted to bind them when the second said shaft turns in one direction at the same speed as the first said shaft.

2. In a transmission of the class described, a power transmitting shaft, a gear rotatable on this shaft, another power transmitting shaft in substantial alignment with the first said shaft, a housing connected to the second-mentioned shaft and rotatable therewith embodying a transmission member, overrunning clutch mechanism embodying binding means between the said transmission member and said rotatable gear adapted to bind them when the said second shaft turns in one direction at the same speed as the said rotatable gear thereby transmitting rotative power to the second said shaft from said rotatable gear, a second gear rotatable on the first said power transmitting shaft, gear means operatively connecting said two rotatable gears, a third power transmitting shaft in substantial alinement with the first said shaft, and clutch means adapted to operatively connect the third said shaft with the first said shaft and also with the second said rotatable gear.

3. In a transmission of the class described according to claim 2 embodying control means to disengage said clutch means and thereby disconnect the third said shaft from the first said shaft and from the second said rotatable gear, said control means embodying instrumentalities for simultaneously connecting the second said shaft with the first said rotatable gear.

4. In a transmission of the class described comprising two power transmitting shafts, clutching mechanism between the said two shafts adapted for clutching engagement to thereby operatively connect the said two shafts, manually controlled means to move said clutching mechanism out of clutching engagement, overrunning clutch mechanism embodying binding means between the said two shafts adapted to bind said two shafts when one of the said two shafts turns in one direction at the same speed as the other, means for automatically engaging said first-mentioned clutching mechanism when said overrunning clutch mechanism binds said two shafts embodying a solenoid magnet, and electrical supply means so arranged as to operatively connect with said solenoid magnet to thereby energize it when said overrunning clutch mechanism binds, and an armature connected to said first-mentioned clutching mechanism and so positioned that the energizing of said solenoid magnet moves said armature and thereby engages said first-mentioned clutching mechanism.

5. In a transmission of the class described comprising two power transmitting shafts, clutching mechanism between the said two shafts adapted for clutching engagement to thereby operatively connect the said two shafts, manually controlled means to move said clutching mechanism out of clutching engagement, overrunning clutch mechanism embodying binding means between the said two shafts adapted to bind said two shafts when one of the said two shafts turns in one direction at the same speed as the other, means for automatically engaging said first-mentioned clutching mechanism when said overrunning clutch mechanism binds said two shafts embodying a solenoid magnet, and electrical supply means so arranged as to operatively connect with said solenoid magnet to thereby energize it when said overrunning clutch mechanism binds, and an armature connected to said first-mentioned clutching mechanism and so positioned that the energizing of said solenoid magnet moves said armature and thereby engages said first-mentioned clutching mechanism, and switch means operatively connected to said armature adapted to disconnect said electrical supply means from said solenoid magnet when said first-mentioned clutching mechanism engages and operatively connects said two shafts.

6. In a transmission of the class described comprising two power transmitting shafts, clutching mechanism between the said two shafts adapted for clutching engagement to thereby operatively connect the said two shafts, manually controlled means to move said clutching mechanism out of clutching engagement, overrunning clutch mechanism embodying binding means between the said two shafts adapted to bind said two shafts when one of the said two shafts turns in one direction at the same speed as the other, means for automatically engaging said first-mentioned clutching mechanism when said overrunning clutch mechanism binds said two shafts embodying a solenoid magnet, and electrical supply means so arranged as to operatively connect with said solenoid magnet to thereby energize it when said overrunning clutch mechanism binds, and an armature connected to said first-mentioned clutching mechanism and so positioned that the energizing of said solenoid magnet moves said armature and thereby engages said first-mentioned clutching mechanism, and a housing connected to and revolving with one said shaft, and enclosing said clutching mechanism.

7. In a transmission of the class described comprising two power transmitting shafts, clutching mechanism between the said two shafts adapted for clutching engagement to thereby operatively connect the said two shafts, manually controlled means to move said clutching mechanism out of clutching engagement, overrunning clutch mechanism embodying binding means between the said two shafts adapted to bind said two shafts when one of the said two shafts turns in one direction at the same speed as the other, means for automatically engaging said first-mentioned clutching mechanism when said overrunning clutch mechanism binds, said two shafts embodying a solenoid magnet, and electrical supply means so arranged as to operatively connect with said solenoid magnet to thereby energize it when said overrunning clutch mechanism binds, and an armature connected to said first-mentioned clutching mechanism and so positioned that the energizing of said solenoid magnet moves said armature and thereby engages said first-mentioned clutching mechanism, and a housing connected to and revolving with one said shaft, and enclosing said clutching mechanism, said overrunning clutch binding means embodying a binding member fixed to one of said shafts and a sleeve mounted in the said housing, said binding member and sleeve being adapted to be operatively connected by said binding means.

8. In a power transmission of the class described according to claim 7, embodying a plurality of electrical contact members between said sleeve and housing adapted to be brought into contact with each other when said sleeve binds with said binding member.

9. In a power transmission of the class described according to claim 7, embodying an electrical contact member carried by said sleeve, an electrical contact member carried by said housing, said contact members adapted to be brought into contact with each other when said sleeve binds with said binding member.

10. In a transmission of the class described comprising two power transmitting shafts, clutching mechanism between the said two shafts adapted for clutching engagement to thereby operatively connect the said two shafts, manually controlled means to move said clutching mechanism out of clutching engagement, overrunning clutch mechanism embodying binding means between the said two shafts adapted to bind said two shafts when one of the said two shafts turns in one direction at the same speed as the other, means for automatically engaging said first-mentioned clutching mechanism when said overrunning clutch mechanism binds said two shafts embodying a solenoid magnet, and electrical supply means so arranged as to operatively connect with said solenoid magnet to thereby energize it when said overrunning clutch mechanism binds, and an armature connected to said first-mentioned clutching mechanism and so positioned that the energizing of said solenoid magnet moves said armature and thereby engages said first-mentioned clutching mechanism, and a housing connected to and revolving with one said shaft, and enclosing said clutching mechanism, said overrunning clutch binding means embodying a binding member fixed to one of said shafts and a sleeve mounted in the said housing, said binding member and sleeve being adapted to be operatively connected by said binding means, an electrical contact member carried by said sleeve, an electrical contact member carried by said housing, said contact members adapted to be brought into contact with each other when said sleeve binds with said binding member, and spring means between said sleeve and housing to normally keep said sleeve in a position relative to said housing whereby said contact members are spaced from each other.

11. In a transmission of the class described, a transmission casing, a power transmitting shaft rotatably mounted therein, a second power transmitting shaft having clutching elements thereon and axially aligned with the first said shaft, a gear member rotatable on the second said shaft, clutching elements on the said gear member, a shiftable clutching member slidably secured to the first said shaft and equipped with clutching elements adapted for clutching engagement with the second said shaft clutching elements when the said shiftable clutching member is shifted in one direction, clutching means for operatively connecting the said rotatable gear member and the said shiftable clutching member at will, a power transmitting member rotatable on the second said shaft, a second rotatable gear member axially aligned with the said power transmitting member, overrunning clutch connective means between the said second rotatable gear and the said power transmitting member whereby rotative power may be transmitted from the said second rotatable gear to the said power transmitting member in one direction, a power transmitting countershaft member having gear teeth meshing with the first said rotatable gear and also having gear teeth meshing with the second said rotatable gear, an overrunning, clutch-locking, shiftable, clutching member having provision for clutching the said second, rotatable gear and the first said power transmitting member when shifted in one direction whereby the said second rotatable gear and the first said power transmitting member will turn together, means for operatively connecting the first said shiftable clutching member and the said overrunning clutch-locking shiftable clutching member, whereby they will shift together, and control means for shifting the two last said shiftable clutching members at will.

12. In a transmission of the class described according to claim 11 embodying a reverse idler gear meshing with other gear teeth on the said countershaft member, gear teeth on the first said shiftable clutching member adapted to mesh with the said idler gear when the first said shiftable clutching member is shifted in the direction opposite to that in which it is shifted to clutch the second said shaft.

13. In a transmission of the class described, a transmission casing, a power transmitting shaft rotatably mounted therein, a second power transmitting shaft having clutching elements thereon and axially aligned with the first said shaft, a driving sleeve rotatably mounted on the second said shaft, clutching elements on the said driving sleeve, a shiftable clutching member slidably secured to the first said shaft having clutching elements adapted for clutching engagement with the said clutching elements on the second said shaft and with the said driving sleeve clutching elements when the said shiftable clutching member is shifted in one direction, two gears rotatably mounted on the said driving sleeve each having clutching elements, a second shiftable clutching member slidably secured to the said driving sleeve and having clutching elements adapted for clutching engagement with one of the said two gears when the said second shiftable clutching member is shifted in one direction and adapted for clutching engagement with the other of the said two gears when this said second shiftable clutching member is shifted in the other direction, a power transmitting countershaft member having a plurality of sets of gear teeth one said set meshing with one of the said two gears, and another set with the other of the two said gears, a second power transmitting member rotatable on the second said shaft, a third rotatable gear on the second mentioned power transmitting shaft axially aligned with the said second power transmitting member, overrunning clutch connective means between the said third rotatable gear and the said second power transmitting member, whereby rotative power may be transmitted from the said third rotatable gear to the said second power transmitting member in one direction, gear teeth on the said countershaft member meshing with the said third rotatable gear, control means for shifting the first said shiftable clutching member at will, and control means for shifting the said second shiftable clutching member at will.

14. In a transmission of the class described according to claim 13, embodying an overrunning clutch-locking, shiftable, clutching member having clutching elements for clutching the said third rotatable gear and the said second power transmitting member when shifted in one direction whereby they will then turn together.

15. In a transmission of the class described, a transmission casing, a power transmitting shaft rotatably mounted therein, a second power transmitting shaft having clutching elements thereon and axially aligned with the first said shaft, a driving sleeve rotatably mounted on the second said shaft, clutching elements on the said driving sleeve, a shiftable clutching member slidably secured to the first said shaft having clutching elements adapted for clutching engagement with the said clutching elements on the second said shaft, and with the said driving sleeve clutching elements when the said shiftable clutching member is shifted in one direction, two gears rotatably mounted on the said driving sleeve each having clutching elements, a second shiftable clutching member slidably secured to the said driving sleeve and having clutching elements adapted for clutching engagement with one of the said two gears when the said second shiftable clutching member is shifted in one direction and adapted for clutching engagement with the other of the said two gears when this said second shiftable clutching member is shifted in the other direction, a power transmitting countershaft member having a plurality of sets of gear teeth one said set meshing with one of the said two gears, and another set with the other of the two said gears, a second power transmitting member rotatable on the second said shaft, a third rotatable gear on the second mentioned power transmitting shaft axially aligned with the said second power transmitting member, overrunning clutch connective means between the said third rotatable gear and the said second power transmitting member, whereby rotative power may be transmitted from the said third rotatable gear to the said second power transmitting member in one direction, gear teeth on the said countershaft member meshing with the said third rotatable gear, control means for shifting the first said shiftable clutching member at will, and control means for shifting the said second shiftable clutching member at will, an overrunning clutch-locking, shiftable, clutching member having clutching elements for clutching the said third rotatable gear and the said second power transmitting member when shifted in one direction whereby they will then turn together, and means for operatively connecting the first said shiftable clutching member and the said overrunning clutch-locking shiftable member, whereby they will be shifted together, and control means for shifting these two connected shiftable clutching members at will.

16. In a transmission of the class described according to claim 15, embodying a reverse idler gear meshing with another of said plurality of sets of gear teeth on the said countershaft member, gear teeth on the first said shiftable clutching member adapted to mesh with the said idler gear when the first said shiftable clutching member is shifted in the direction opposite to that in which it is shifted to clutch the second said shaft.

ALBERT B. CLARK.